United States Patent
Ferraguti et al.

(10) Patent No.: US 12,496,718 B2
(45) Date of Patent: Dec. 16, 2025

(54) METHOD TO CONTROL, THROUGH DIRECT TEACHING, A CLOSED ROBOTISED SYSTEM AND RELATIVE PROCESSING PLANT

(71) Applicant: GAIOTTO AUTOMATION S.P.A., Imola (IT)

(72) Inventors: Federica Ferraguti, Piacenza (IT); Mattia Bertuletti, Piacenza (IT); Mattia Gambazza, Piacenza (IT); Matteo Ragaglia, Piacenza (IT); Cesare Fantuzzi, Piacenza (IT)

(73) Assignee: GAIOTTO AUTOMATION S.P.A., Imola (IT)

( * ) Notice: Subject to any disclaimer, the term of this patent is extended or adjusted under 35 U.S.C. 154(b) by 80 days.

(21) Appl. No.: 18/696,238

(22) PCT Filed: Sep. 29, 2022

(86) PCT No.: PCT/IB2022/059281
§ 371 (c)(1),
(2) Date: Mar. 27, 2024

(87) PCT Pub. No.: WO2023/053051
PCT Pub. Date: Apr. 6, 2023

(65) Prior Publication Data
US 2024/0383141 A1    Nov. 21, 2024

(30) Foreign Application Priority Data

Sep. 29, 2021 (IT) .................... 102021000024899

(51) Int. Cl.
*B25J 9/16* (2006.01)
*B25J 11/00* (2006.01)
*B25J 13/08* (2006.01)

(52) U.S. Cl.
CPC ............. *B25J 9/1664* (2013.01); *B25J 9/163* (2013.01); *B25J 9/1633* (2013.01); *B25J 11/0075* (2013.01); *B25J 13/085* (2013.01)

(58) Field of Classification Search
CPC ........ B25J 9/1664; B25J 9/163; B25J 9/1633; B25J 11/0075; B25J 13/085; B25J 9/1656;

(Continued)

(56) References Cited

U.S. PATENT DOCUMENTS

| 4,589,810 A | 5/1986 | Heindl et al. | |
| 8,108,190 B2 * | 1/2012 | Riener | G09B 23/32 703/11 |

(Continued)

FOREIGN PATENT DOCUMENTS

| JP | 2015-202536 A | 11/2015 |
| JP | 2019-529149 A | 10/2019 |
| WO | 2013/035244 A1 | 3/2013 |

OTHER PUBLICATIONS

Office Action received for Japanese Patent Application No. 2024-519680, mailed on Apr. 15, 2025, 6 pages (3 pages of English Translation and 3 pages of Original Document).

(Continued)

*Primary Examiner* — Jaime Figueroa
(74) *Attorney, Agent, or Firm* — Workman Nydegger (57) ABSTRACT

A method to control a closed robotised system comprises a learning step and a reproduction step, wherein, during the learning step, an operator exerts a force and/or a torque (Fc) on a driving assembly, whose sensor detects an applied force and/or torque (Fext); and wherein a processing system carries out an admittance control obtaining, depending on the data detected by the sensor, indications (Xref, X*ref) of movement for the robot manipulator in the Cartesian space; the processing system, following the admittance control, (Continued)

delivers the indications (Xref, X*ref) of movement in the Cartesian space to a trajectory interpolation unit of the robotised system so as to generate a desired trajectory through interpolation.

13 Claims, 3 Drawing Sheets

(58) Field of Classification Search
CPC ........... G05B 2219/36401; G05B 2219/39257; G05B 2219/45065; G05B 19/423; G05B 2219/39325; G05B 2219/39339; G05B 2219/40333; G05B 2219/40354; G05B 2219/45013; B28B 11/048
USPC .............. 700/245–264; 318/568.11–568.25
See application file for complete search history.

(56) References Cited

U.S. PATENT DOCUMENTS

| | | | |
|---|---|---|---|
| 8,280,552 B2* | 10/2012 | Takesue | B25J 13/025 |
| | | | 700/260 |
| 9,272,418 B1* | 3/2016 | Guerin | B25J 9/1661 |
| 9,339,934 B2* | 5/2016 | Kogan | G05B 19/423 |
| 9,694,495 B1* | 7/2017 | Edsinger | B25J 9/1656 |
| 10,065,311 B1 | 9/2018 | Buschmann | |
| 10,434,660 B2* | 10/2019 | Meyer | B25J 9/1607 |
| 11,241,794 B2* | 2/2022 | Fantuzzi | B28B 11/048 |
| 11,305,424 B2* | 4/2022 | Yamane | B25J 9/1633 |
| 11,420,331 B2* | 8/2022 | Yamane | B25J 9/1676 |
| 11,440,194 B2* | 9/2022 | Yamane | B25J 9/161 |
| 2004/0254771 A1* | 12/2004 | Riener | G09B 23/32 |
| | | | 703/7 |
| 2010/0262291 A1* | 10/2010 | Takesue | G05B 19/423 |
| | | | 700/260 |
| 2012/0130541 A1 | 5/2012 | Szalek | |
| 2013/0310977 A1 | 11/2013 | Tsusaka et al. | |
| 2015/0081098 A1* | 3/2015 | Kogan | B25J 13/085 |
| | | | 901/46 |
| 2015/0290798 A1 | 10/2015 | Iwatake | |
| 2016/0059415 A1* | 3/2016 | Guerin | B25J 9/163 |
| | | | 901/4 |
| 2017/0144304 A1* | 5/2017 | Guerin | B25J 9/1664 |
| 2018/0080841 A1* | 3/2018 | Cordoba | A61B 34/35 |
| 2018/0290303 A1* | 10/2018 | Guerin | B25J 13/00 |
| 2019/0060155 A1* | 2/2019 | Corrigan | A61H 1/0266 |
| 2019/0105785 A1* | 4/2019 | Meyer | A61B 34/30 |
| 2019/0358817 A1* | 11/2019 | Ghazaei Ardakani | |
| | | | B25J 9/1689 |
| 2020/0030983 A1* | 1/2020 | Fantuzzi | B28B 17/0081 |
| 2020/0290196 A1* | 9/2020 | Böhme | G05B 19/423 |
| 2021/0078178 A1* | 3/2021 | Yamane | B25J 19/02 |
| 2022/0371186 A1* | 11/2022 | Zhang | B25J 9/0084 |

OTHER PUBLICATIONS

International Search Report and Written Opinion received for PCT/IB2022/059281, mailed Jan. 25, 2023, 19 pages.
Lee, C.S.G, et al. "Geometric Approach in Solving Inverse Kinematics of PUMA robots", IEEE Transactions on Aerospace and Electronic Systems, IEEE Service Center, No. 6, Nov. 1, 1984, pp. 695-706.
Landi Chiara Talignani, et al. "Tool compensation in walk-through programming for admittance-controlled robots", IECON 2016—42nd Annual Conference of the IEEE Industrial Electronics Society, IEEE, Oct. 23, 2016, pp. 5335-5340.
Bruno Siciliano, et al. "Chapter 9—Force Control—Robotics Modelling Planning and Control", in : Robotics Modelling Planning and Control, Dec. 23, 2009, pp. 363-406.

* cited by examiner

FIG. 3

METHOD TO CONTROL, THROUGH DIRECT TEACHING, A CLOSED ROBOTISED SYSTEM AND RELATIVE PROCESSING PLANT

CROSS-REFERENCE TO RELATED APPLICATIONS

The present invention is a 35 U.S.C. § 371 U.S. National Stage of PCT Application No. PCT/IB2022/059281, filed on Sep. 29, 2022, which claims priority from Italian Patent Application No. 102021000024899 filed on Sep. 29, 2021. The entire content of each of the aforementioned patent applications is incorporated herein by reference.

FIELD OF THE ART

The present invention relates to a method to control, in particular through direct teaching, a closed robotised system, in particular comprising a robot manipulator, and to a relative processing plant.

The present invention finds advantageous, but not exclusive application in the field of ceramics, more particularly the glazing of ceramic articles, to which the following discussion will explicitly refer without losing its generality.

BACKGROUND OF THE INVENTION

In the field of processing ceramic articles, it is known to use robotised devices supporting spraying heads to paint and/or glaze surfaces.

This type of approach, also used in other areas such as welding, is highly versatile and effective and has led to an increase in production speed and improvements in the repeatability and precision of the industrial process.

In recent years, the use of industrial manipulators (hereafter also referred to simply as robots) has changed radically, moving from an idea of complete segregation of the workspace (obtained through physical barriers) to a scenario in which robots and human operators share the same workspace and also collaborate side by side. In this context, robots are becoming key elements in increasing the competitiveness of production, as the physical human-robot interaction (pHRI) can certainly help companies achieve a greater production flexibility to cope with rapidly evolving products. However, the widespread adoption of robotised technologies is still undermined by some well-known factors, including the inherently complex and time-consuming nature of robot programming.

In view of the fact that a same robot can paint and/or glaze articles of different shapes, the way in which it is "taught" how to act has become an increasingly important working step and should be as simple and intuitive as possible.

Traditional methods for programming industrial manipulators typically consist in using handhelds (teach pendants) for "point-to-point" programming (PTP) or in simulating the activity of the manipulator within an "offline" programming environment.

In the former case, not only does the operator have to learn to use the teach pendant and the robot programming language properly, but the intrinsic point-to-point programming style of these apparatuses is only efficient for particularly simple movements. In particular, the robot itself must be used to program the robot (i.e. a production stop is generated) and the programming is rather complicated (it is necessary to move the robot, at so-called "collaborative" reduced speeds, at every point of the path and save its position); and in order to be able to evaluate the goodness of the result, the program must be completed and then executed; if the result is not satisfactory, these operations must be repeated.

In the second case ("off-line" programming), on the other hand, it is absolutely necessary to know the platform-specific programming language (and/or a dedicated programming environment, for example a 3D CAD program), thus requiring specific and usually excessive knowledge from the human operator for the machine operator's task.

The "off-line" and "PTP" programming methods are complex and laborious and this makes them particularly inefficient for the production of small and medium-sized batches.

To overcome these shortcomings, direct teaching programming strategies generally defined as "walk-through" programming (also referred to as "lead-through" or "manual guidance" programming) have been developed, with the most diverse practical applications, such as spraying or welding. These programming strategies are characterized by the fact that the operator grasps the manipulator and manually leads it on the desired path up to the desired positions, without any prior knowledge of the specific programming language and/or of the functions offered by the specific handheld (teach pendant). During the learning step, a control unit (hereinafter also called a controller) of the robot records the intermediate points or the entire trajectory imposed by the human operator, so that the manipulator itself can subsequently reproduce this desired movement independently.

Generally, direct teaching programming architectures are based on two key elements: a detection system (sensor) and an admittance (or impedance) control algorithm managed by the control unit (or controller). The detection system is responsible for measuring the interaction forces/torques exerted by the operator on the manipulator.

The aforesaid objective can be achieved mainly in two ways: by exploiting the direct detection of the torque at the joints of the manipulator (which, however, is often not made available to the customer by the manipulator manufacturers or is influenced by a poor frequency and/or resolution of the data); or by mounting a special sensor (for example a dedicated load cell) on the end effector (i.e. the portion/element/end link, i.e. after the last joint) of the manipulator.

However, the need to accurately detect what the operator imposes necessarily entails problems of both cost and hardware robustness. In fact, the manipulators natively provided with a system for detecting the force/torque exerted by the operator are generally also characterized by high costs and limited load.

In the control of the industrial manipulators, for example in PCT/IB2017/055972, admittance control algorithms are known, which are responsible for the translation of the force/torque measurements imparted by an operator to a specific sensor, in corresponding displacements in the space of the joints (in the case where torque sensors are available on each joint), or in the Cartesian space (in the case where there is a load sensor), or both. In the latter two cases, however, the Cartesian reference is immediately converted, through reverse kinematics, into corresponding references in the space of the joints.

In order to implement these references, an "open" control architecture (or open system) is required that allows the admittance control algorithm to directly overwrite the position of the joint and the respective speed references. In other words, according to the state of the art, as shown in PCT/IB2017/055972, the direct teaching is generally carried out by providing open systems with position references, or with position and speed references of the joints of the manipulator in a real-time frequency streaming of the control system of the manipulator itself. In essence, following the admittance control, the control unit immediately processes, through reverse kinematics, the position to be controlled at each joint of the robot manipulator.

Theoretically, the possibility of interfacing directly with a low-level real-time control makes the solution of an open control architecture preferable, especially when direct teaching is used to record continuous high-speed trajectories (through the aforesaid streaming). However, this approach leads to critical issues from a safety point of view. In particular, for these reasons, a Cartesian speed limit of 250 mm/s has been defined in the safety standards for the direct teaching of industrial manipulators. Although this limitation may be appropriate for scenarios where only intermediate points need to be stored, it may prevent the use of direct teaching programming when it is necessary to record continuous trajectories carried out at high speed. For example, the spraying robots cannot be manually guided at low Cartesian speeds, as their movement must be smooth and synchronised with the parameters of the spraying system, which in turn cannot (often comprising also on/off valves) be kinematically modulated with respect to time. The same observations can also be made about other types of application, such as welding, polishing, etc.

It should also be noted that the majority of the controllers of industrial manipulators do not have an open architecture. This means that, once an industrial manipulator has been purchased, it is not possible to force the manipulator itself to follow a specific trajectory by transmitting in real time the position of the joint and the speed reference signals to its controller depending on the force/torque detected by the detection system. In fact, the term "closed" system refers to the majority of the industrial manipulators currently on the market, in which it is not possible to directly overwrite the position, or the position and the speed of the joints of the manipulator.

Aim of the present invention is to provide a method to control, in particular through direct teaching, a closed robotised system, in particular an industrial manipulator and a relative processing plant, which allow to overcome, at least partially, the drawbacks of the known art and are, at the same time, easy and economical to realize.

SUMMARY

According to the present invention there are provided a method to control, in particular through direct teaching, a closed robotised system, in particular comprising a robot manipulator and a processing plant as claimed in the following independent Claims and, preferably, in any one of the Claims directly or indirectly dependent on the independent Claims.

The Claims describe preferred embodiments of the present invention forming an integral part of the present disclosure.

In this text, "torque" means "moment of a force" (torque) or in any case another quantity containing the (more precisely, function of) the moment of a force. "Moment of a force" (or "mechanical moment") has as its common meaning the attitude of a force to impart a rotation on a rigid body around a point (in the plane) or an axis (in the space) when this is not applied to its center of mass.

In this text, "force" also means (in addition to the meaning normally given to this term, i.e. the meaning of imparting a translation on a rigid body along the axis of application) another quantity containing the (more precisely, function of) force. According to some embodiments, "force" means force according to its normal meaning.

BRIEF DESCRIPTION OF THE DRAWINGS

The invention will now be described with reference to the accompanying drawings, which show some non-limiting examples of embodiments, wherein.

DETAILED DESCRIPTION

Figure 1:
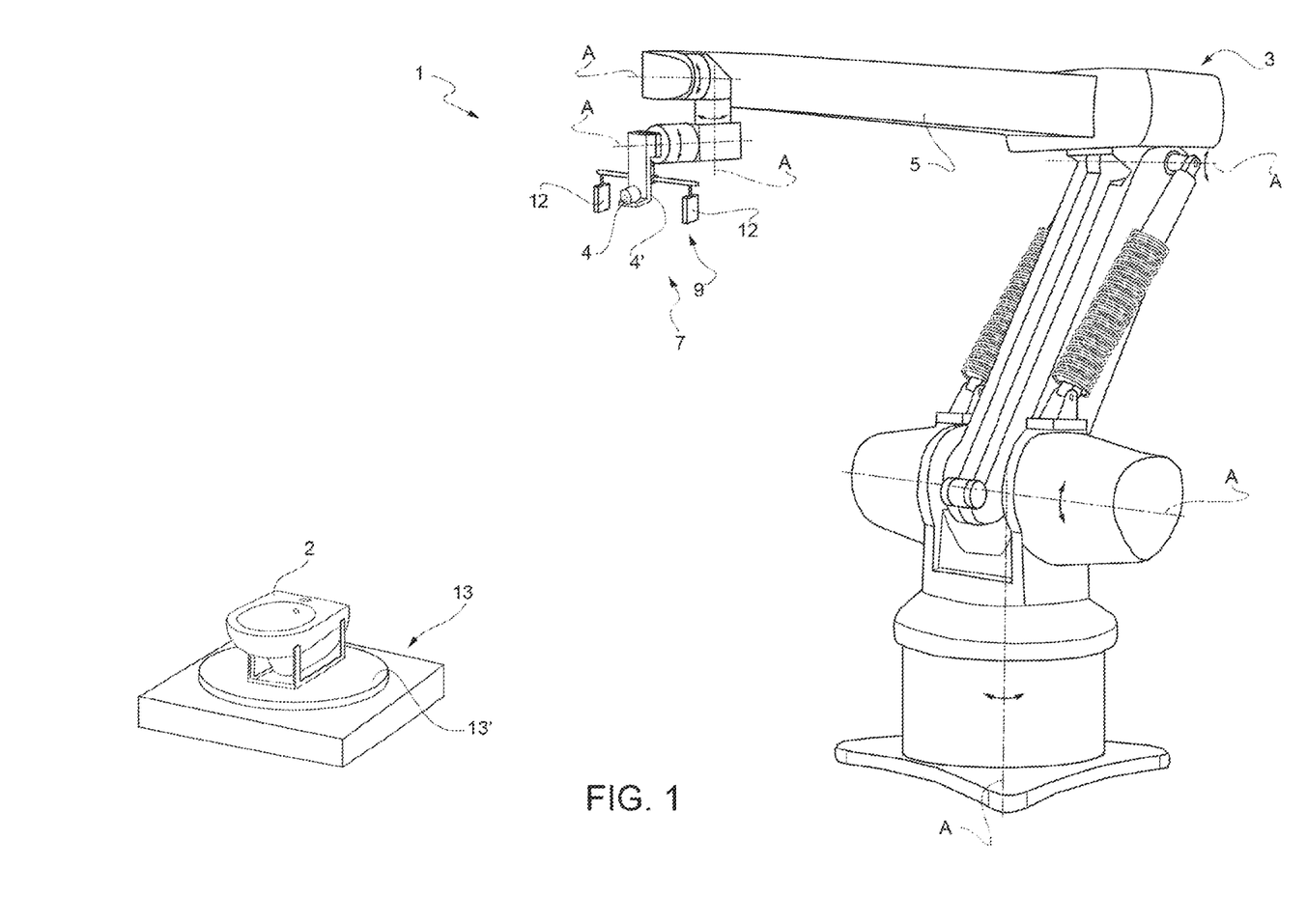
FIG. 1 is a perspective view with details removed for clarity's sake of a plant in accordance with the present invention.

In accordance with a first aspect of the present invention, in FIG. 1, 1 denotes as a whole a processing plant for a closed robotised system 3, in particular, but not limited to, for the treatment of an article 2. The plant 1 comprises a robotised system 3, which, in turn, comprises an end effector 4, which is configured to process or interact with an article being produced (for example the article 2).

Figure 2:
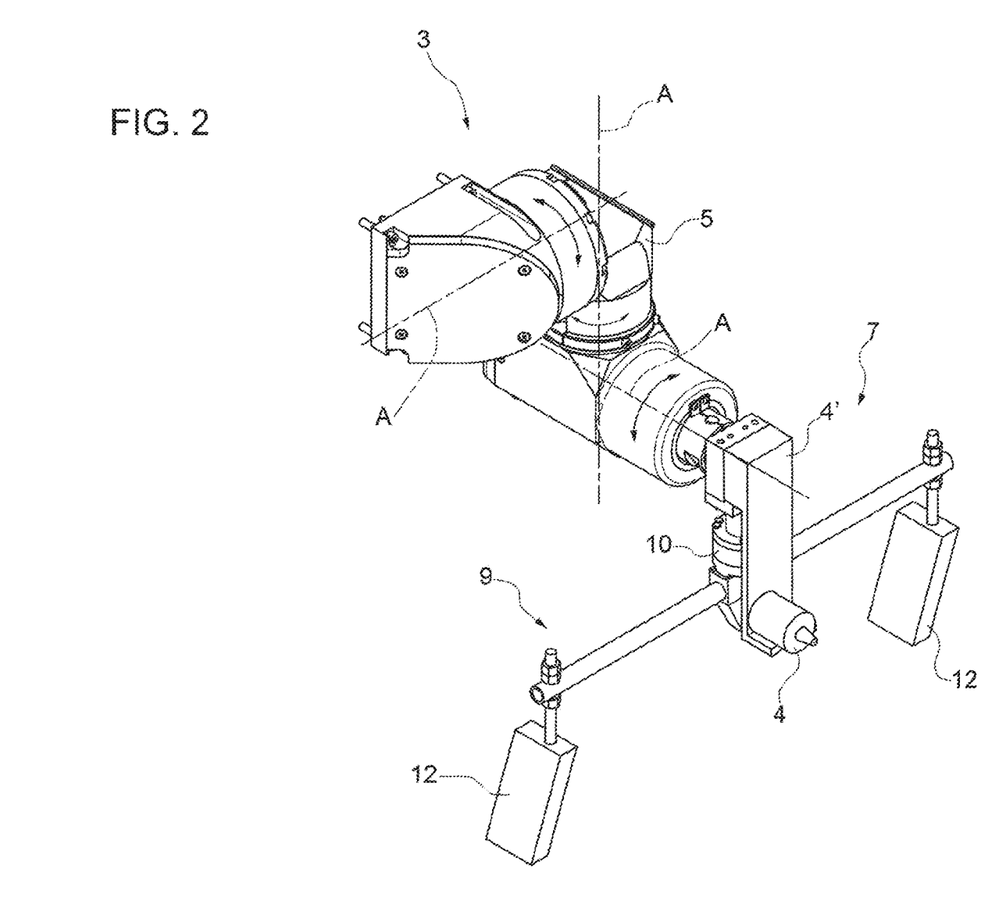
FIG. 2 is a perspective and enlarged scale view of a detail of FIG. 1 in a second configuration.

In the non-limiting embodiment of FIGS. 1 and 2, the end effector 4 is a spraying head, which is configured to emit a jet of a substance to cover at least part of the surface of the article 2. In other non-limiting and non-illustrative embodiments, the end effector 4 is a welding head, a gripping head, a gripper, or any other machining tool.

Advantageously, the plant 1 comprises a robot manipulator 5, which is movable with at least three (in particular at least four, more in particular six) degrees of freedom and on which the end effector 4 (for example the spraying head) is mounted. The plant also comprises a control system 6 (FIG. 3) and a driving assembly 7.

The control system 6 comprises a storage unit 8 and is configured to control the movement of the robot manipulator 5 so as to move the end effector 4 (i.e. the spraying head). In particular, the control system 6 is also designed to adjust the operation of a tool mounted on board the end effector 4 (for example the spraying head).

The driving assembly 7 is configured to be operated by an operator (not shown) so as to transfer indications of movement to the robot manipulator 5. In particular, the driving assembly 7 is also configured to transfer operation indications to the end effector 4 (e.g., the spraying head).

In particular, the robot manipulator 5 (FIGS. 1 and 2) comprises several sections (links) connected to each other in succession. Each section is rotatable with respect to the previous one around a respective axis A of rotation. The rotation around each of the axes A represents a degree of freedom of the robot manipulator 5. In the embodiment shown, the robot manipulator 5 has six degrees of freedom and, more precisely, has six axes A of rotation.

The robot manipulator 5 is typically an anthropomorphic industrial type robot and can for example be the GA-OL robot by Gaiotto Automation SpA. The robot manipulator 5 may also have more than six degrees of freedom (in particular, more than six axis A of rotation). In some non-limiting cases, the degrees of freedom may be five axes of rotation and one translation (e.g. horizontal or vertical).

In the non-limiting embodiment of FIGS. 1 and 2, the driving assembly 7 comprises a handling device 9, upon which, in use, the operator exerts a force and a torque $F_c$ (also called contact force—FIG. 3); a sensor 10, which is connected to the end effector 4 and is designed to detect the force and the torque $F_s$ applied to the handling device 9; and a processing system 11, which is designed to provide Cartesian movement indications for the robot manipulator 5 depending on the data detected by the sensor 10 (more precisely depending on the force and torque $F_s$ detected) and following an admittance (or impedance) control AC.

In particular, the sensor 10 has (at least) three (preferably at least four, in particular six) degrees of freedom and is capable of measuring (at least) three forces and three torques (in a Cartesian reference system). The sensor 10 may be any known device capable of performing the functions described above.

According to specific non-limiting embodiments, the sensor 10 is, for example, the FTSens which, having measured three forces and three torques, is able to transmit them digitally over a CAN network. FTSens was developed by the IIT (Italian Institute of Technology) in Genoa. In this case, the measurements are detected thanks to a strain gauge technology, based on the deformation of strain gauges (of the electrical/resistance type) placed inside the body of the sensor.

According to other specific non-limiting embodiments, the sensor 10 is, for example, the FT Axia sensor 80, developed by ATI Automation; which performs data exchange via EtherCAT® protocol.

The storage unit 8 is designed to store the movements $q_{robot}$ made by the robot manipulator 5 while the end effector 4 (i.e. the spraying head) is moved by the operator by means of the driving assembly 7. The control system 6 is designed to control the movement of the robot manipulator 5 depending on the movements $q_{robot}$ stored by the storage unit 8. In particular, the control system 6 is designed to control the movement of the robot manipulator 5 so that the robot manipulator 5 (and the spraying head 4) substantially repeats the movements $q_{robot}$ stored by the storage unit 8, more particularly so that the end effector 4 (the spraying head) substantially repeats the movements made while the operator moves the end effector 4.

In particular, "movement" or "movements" means in this text a path and speed along the path. More precisely, the movement of the robot manipulator 5 is the movement in the space of each movable part of the robot manipulator 5 in the space.

In particular, the handling device 9 is mounted on the robot manipulator 5 (more particularly, on the sensor 10). Advantageously but not necessarily, the handling device 9 is mounted on the robot manipulator 5 at (i.e. on board) the end effector 4, in particular at an end of the robot manipulator 5. More precisely, the handling device 9 is connected to the robot manipulator 5 through the sensor 10 (which supports the handling device 9). According to some embodiments, the sensor 10 is mounted on the robot manipulator 5.

In particular, the handling device 9 comprises at least one grip 12, which is designed to be grasped by the operator to move the robot manipulator 5 (and, therefore, the end effector 4).

According to some non-limiting embodiments, the handling device 9 comprises (at least) two grips 12, which are designed to be grasped by the operator so as to move the robot manipulator 5 (and, therefore, the spraying head 4) and are connected to each other integrally, in particular by means of a connection element (of the handling device 9). More particularly, the connection element comprises (more precisely is) a bar transverse to the grips 12. In these cases, advantageously but not necessarily, the crossbar is mounted on the sensor 10; more precisely, the crossbar is between the sensor 10 and the grip(s) 12.

In particular, the end effector 4 is mounted on the robot manipulator 5 by means of a support 4', which protrudes from the robot manipulator 5 (in particular, from one end of the robot manipulator 5).

According to some embodiments (such as that shown in FIGS. 1 and 2), the support 4' has a first end connected to the robot manipulator 5, extends (downwards) beyond the sensor 10 and has a coupling zone (at a second end opposite the first end) at which the spraying head 4 is connected. The sensor 10 is arranged between the handling device 9 and the first end. According to some non-limiting embodiments, the support 4' extends between the two grips 12. In these cases, the end effector 4, for example the spraying head, is arranged between the two grips 12.

According to alternative embodiments (such as that of FIG. 9), the support 4' extends from the robot manipulator 5 substantially in a horizontal direction.

According to some non-limiting embodiments, the driving assembly 7 (in particular, the handling device 9) comprises commands (for example, buttons, levers, etc.), which are designed to be operated by the operator so as to adjust, over time, at least one operating parameter of the end effector 4. The storage unit 8 is configured to store the adjustment of the operating parameter (and its variation over time); the control system 6 is designed to adjust the activation of the spraying head 4 so that the adjustment of the operating parameter (and its variation over time) stored is substantially repeated, in particular in a coordinated manner with the movements made by the robot manipulator 5.

According to some non-limiting embodiments, the driving assembly 7 is designed to provide indications on the operating parameter (and its variation over time) to the control system 6, which is designed to activate the spraying head 4 depending on the indications received from the driving assembly 7.

Advantageously but not necessarily, the operating parameter is selected from the group consisting of: adjustment of the flow (quantity in the unit of time) of the cover substance exiting from the spraying head, adjustment of the spraying degree of the cover substance exiting from the spraying head, adjustment of the amplitude of the jet of the cover substance exiting from the spraying head, adjustment of the shape of the jet of the cover substance exiting from the spraying head, temperature and/or duration of a weld, pressure and/or amplitude of a polishing (and a combination thereof).

The operating parameter can also simply be activation (on) and deactivation (off), e.g. of the jet.

In some cases (and not necessarily), the driving assembly 7 (in particular, the handling device 9) comprises a command enabling the movement of the robot manipulator 5 (normally called in jargon "dead man") and allows to stop the robot manipulator 5 in case of emergency. Typically, this command includes a button that must be held down by the operator in order for the robot manipulator 5 to be enabled to move. If, in use, this button is released or pressed too long, the control system 6 disables the possibility of the robot manipulator 5 to move.

According to some non-limiting embodiments, the plant 1 (in particular, the robotised device 3) also comprises a device 13 for the movement of the article 2; the driving assembly 7 (in particular, the handling device 9) comprises a command (e.g. a button or a lever) designed to be operated by the operator so as to control the device for the movement 13 of the article 2. In these cases, the storage unit 8 is designed to store the position (orientation) of the article 2 set by the operator (and its variation over time). The control system 6 is designed to adjust the operation of the device 13 for the movement of the article 2 based on the position (orientation) of the article 2 (and its variation over time) stored in the storage unit 8. More particularly, the control system 6 is designed to adjust the activation of the device 13 for the movement of the article 2 so as to repeat the position (orientation) of the article 2 (and its variation over time) stored in the storage unit 8.

According to some non-limiting embodiments (such as the one shown), the device 13 comprises a rotatable platform 13', on which, in use, the article 2 is arranged. In particular, the platform 13' is rotatable about a vertical axis (not shown).

Advantageously but not necessarily, the processing system 11 is designed to estimate a non-contact force and torque $F_{nc}$ depending on fixed and variable components resulting from the load (in particular, the handling device 9) of what is mounted on the (more precisely, supported by) sensor 10 (more precisely, a sensitive part of the sensor 10) and is designed to obtain an estimated force and torque $F^*_c$ (of what is applied by the operator on the handling device 9) depending on the detected force and torque $F_{ext}$ (sum of $F_c$ and $F_{nc}$) and on the estimated non-contact force and torque $F_{nc}$. In these cases, the processing system 11 is designed to provide Cartesian movement indications (in particular displacements) for the robot manipulator 5 depending on the force and torque $F^*_c$ estimated by the processing system 11 itself. In particular, the force and the torque $F^*_c$ are estimated by subtracting the non-contact force and torque $F_{nc}$ from the detected force and torque $F_s$.

In particular, it should be noted that all forces and torques indicated above ($F_{nc}$, $F^*_c$, $F_c$ and $F_{ext}$) have components along the three dimensions of the Cartesian space (and optionally the three angles of spatial orientation, for example the Euler angles).

According to some non-limiting embodiments, the fixed and variable components resulting from the load comprise gravity and inertial and Coriolis forces. In particular, the fixed components comprise gravity. In particular, the variable components are estimated (at least in part) depending on the angular speed ω, the angular acceleration α, the linear acceleration a and the inertia (in particular, of the handling device 9) of what is mounted on (more precisely, supported by) the sensor 10.

Advantageously but not necessarily, the processing system 11 comprises a processing unit 14, which is designed to estimate (calculate) the angular speed ω, the angular acceleration α and the linear acceleration a depending on the conformation for each axis of rotation A of the robot manipulator 5. According to some specific non-limiting embodiments, the processing unit 14 comprises (in particular is) a Kalman filter.

These parameters can be obtained directly from the encoders present on the robot manipulator, or through additional accelerometers placed on the robot manipulator 5. Experimental results show that the measurements derived from the encoders are more accurate.

According to some non-limiting embodiments, the processing system 11 also comprises a compensation unit 15 which is designed to estimate the force and torque $F^*_c$ as described above. In particular, the compensation unit 15 is connected to the processing unit 14 and is designed to receive from it the angular speed ω, the angular acceleration α and the linear acceleration a.

Advantageously, but not necessarily, the processing system 11 also comprises a control system 16, which is designed to calculate a reference position $X_{ref}$ (the position of the movable end effector 4 of the robot manipulator 5, on which end the driving assembly 7 is in particular mounted) depending on the force and torque $F^*_c$ (received from the compensation unit 15).

In some non-limiting cases, the control system 16 comprises (is) an admittance control or an impedance control. Advantageously but not necessarily, the control system 16 comprises (is) an admittance control. The admittance control provides a high level of accuracy in non-contact tasks.

In particular, in a specific declination thereof, the admittance control leads the robot to interact with the environment according to a damping mass system characterized by the following equation:

$$M_d \ddot{x} + D_d \dot{x} = F_{ext} \quad (A)$$

wherein, $M_d$ e $D_d$ are the desired inertia and damping matrix, $\dot{x}$ is the Cartesian speed and $\ddot{x}$ is the Cartesian acceleration.

However, since the interaction with the user can lead to instability, the parameters of the admittance control are advantageously but not necessarily varied and therefore inertia and damping are variable over time and not constant. The variable admittance model is, according to some non-limiting embodiments, as follows:

$$M(t)\ddot{x} + D(t)\dot{x} = F_{ext} \quad (B)$$

In particular, the plant 1 (in particular, the robotised device 3) comprises a parameter adaptation unit PA configured to adapt the inertia parameters of the matrix M(t) and the damping parameters of the matrix D(t) (respectively indicated with M and D in FIG. 3) based on the dynamic behaviour of the human operator on the driving assembly 7. In particular, since the robot interacts with the operator, instabilities in the control circuit may occur, depending on the dynamic behaviour of the operator. For this reason, a strategy was implemented to detect the increasing oscillations in the behaviour of the robot and adapt the parameters of the admittance control to restore a desired stable behaviour. The parameter adaptation algorithm adjusts the inertia parameters M and the damping parameters D of the admittance control depending on the detection of an upward oscillation through a detection index, calculated by the admittance controller itself.

According to some non-limiting embodiments, the control system 6 comprises an interpolation unit 17, which is configured to interpolate the reference positions $X_{ref}$ so as to generate a desired trajectory (movement).

In particular, the control system 6 also comprises a position control 18 which is designed to provide the actuation torque to move the robot manipulator 5 to the desired position (in other words, to reproduce the reference position $X_{ref}$).

It should be noted that, according to different embodiments, the processing unit 14, the compensation unit 15, the control system 16, the control system 6 and the position control 18 may be understood as physical devices or as parts of a software system operating as described above.

Advantageously but not necessarily, the plant 1 (in particular, the robotised device 3) further comprises an anti-singularity unit 19 configured to carry out a singularity avoidance control on the indications of movement in the Cartesian space ($X_{ref}$) so as to avoid undesired and/or potentially dangerous behaviours of the robot manipulator 5.

Figure 3:
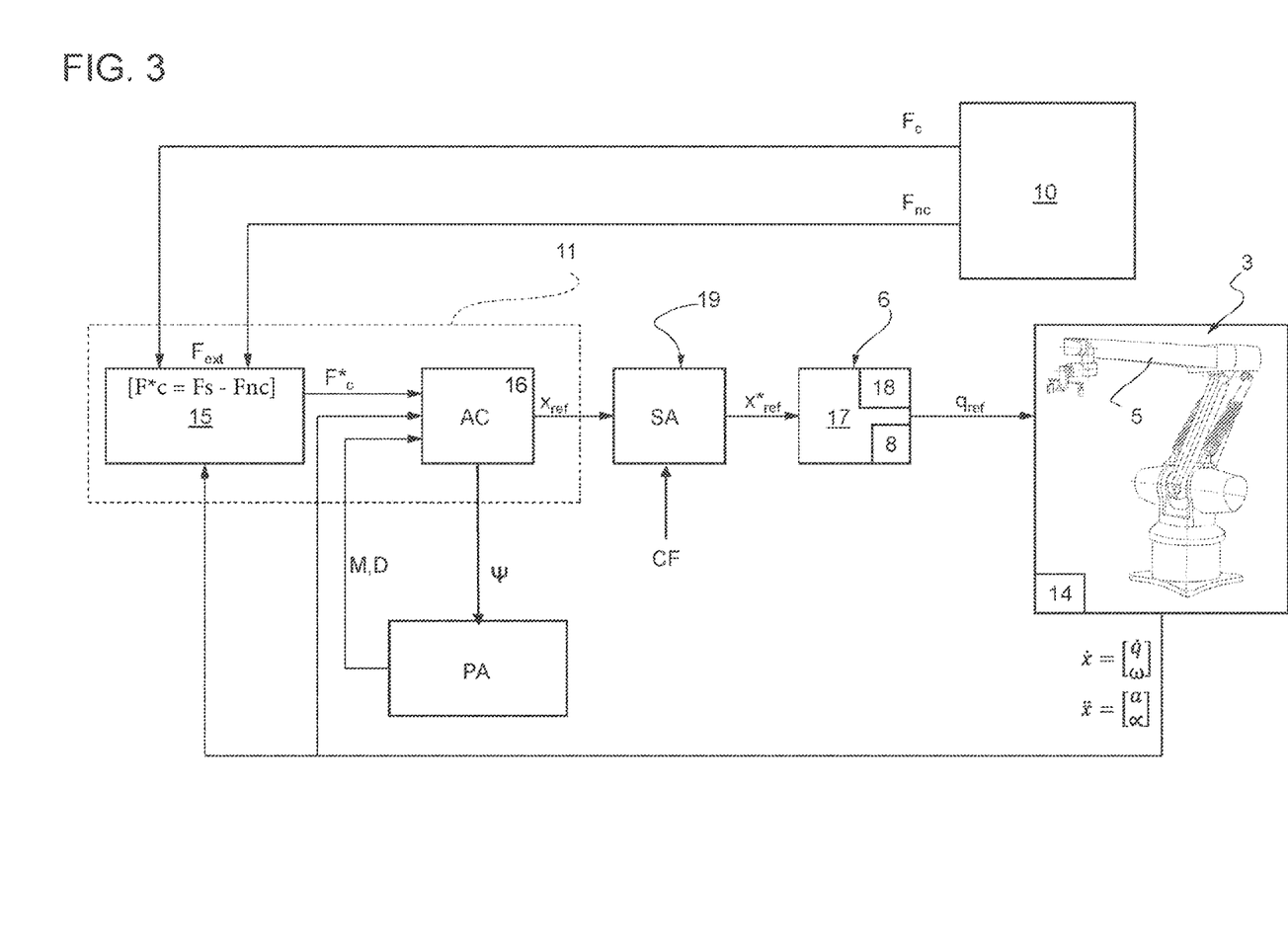
FIG. 3 is a schematic block diagram of a control system of the plant of FIG. 1.

In this scenario, the control system 6 of the robot manipulator 5 (or more specifically the interpolation unit 17 of the trajectory) will transform the reference position $X_{ref}$ of the Cartesian space into reference angles $q_{ref}$ of the articular space and will pass these references to a low-level position controller, which operates independently on each joint. As indicated in FIG. 3, an anti-singularity block SA is included to prevent the robot 5 from reaching a singular configuration in which an error would surely be generated by the interpolation unit 17 (due to the singularity of the Jacobian matrix) or by a relative safety controller (due to a violation of the speed limits of at least one joint).

Some aspects of the operation of the plant 1 will be explained in greater detail with reference to a second aspect of the present invention described below.

According to some non-limiting embodiments, the plant 1 (in particular, the robotised device 3) is configured to implement the method referred to the second aspect of the present invention.

In accordance with the second aspect of the present invention there is provided a method to control a closed robotised system 3 (see the definition of closed system above), which carries out the same functions and comprises the same components as the robotised device 3 described in the context of the first aspect of the present invention. More precisely, the robotised device 3 is like the one described in accordance with the first aspect of the present invention. In particular, the robotised device 3 is part of the plant 1 of the first aspect of the present invention.

The method comprises a learning step, during which the operator moves the end effector 4 of the robot manipulator 5 by means of the driving assembly 7 comprising the force/torque sensor 10 and the movements made by the end effector 4 are stored in the storage unit 8; and a reproduction step, which takes place after the learning step and during which the control system 6 operates the robot manipulator 5 so that the end effector 4 substantially repeats the movements stored in the storage unit 8 (in particular, made during the learning step). In particular, during the learning step, the operator grasps the handling device 9.

During the learning step, the operator exerts a force and a torque $F_c$ on the handling device 9; the sensor 10 detects the force and the torque $F_{ext}$ applied to the handling device 9; and the processing system 11 carries out an admittance control AC obtaining, depending on the data detected by the sensor 10, indications of movement for the robot manipulator 5 in the Cartesian space. In particular, the processing system 11, following the admittance control C, delivers the indications $X_{ref}$ of movement in the Cartesian space to a trajectory interpolation unit 17 of the robotised system 3 so as to generate a desired trajectory through interpolation. In this way, it is possible to use functions also present in the closed systems, without necessarily having to force and overwrite the positions and/or speed of the joints in the space of the joints following an inverse kinematics (as instead is usually the case in the known art solutions related to direct teaching methods).

Some studies show that the intentional human inputs have a dominant frequency in the 0 to 5 Hz range, while the accidental impacts are usually represented by peaks at high frequencies (greater than 10 Hz). Preferably, the frequency of the trajectory interpolation is equal to or greater than 125 Hz, in particular equal to or greater than 250 Hz. This makes it possible to increase the movement speed of the robot manipulator 5 during the learning step by virtue of an extremely lower latency compared to the frequencies for accidental impacts.

Advantageously but not necessarily, the method comprising the further steps of creating a dynamic target reference system (DTRF—which is a function usually available also in the closed systems) for the robot manipulator 5; and setting the position of the end effector 4 as the initial reference position of the dynamic target reference system (DTRF).

In particular, the term dynamic target reference system (DTRF) refers to a time-varying reference system with at least one degree of freedom that the manipulator must follow in Cartesian coordinates.

In particular, the method comprises the further step of synchronizing the position of the end effector 4 with that of the dynamic target reference system (DTRF).

Preferably, furthermore, the method comprises the further step of changing the position of the dynamic target reference system (DTRF) based on the indications $X_{ref}$ of movement processed during the admittance control AC.

In some non-limiting cases, the interpolation unit 17 of the robotised system 3 converts the indications $X_{ref}$ of movement in the Cartesian space into indications $q_{ref}$ of movement in the joint space.

Advantageously, but not necessarily, the method comprising the further step of, following the admittance control AC, but before the interpolation carried out by the unit 17, carrying out a singularity control SA on the indications $X_{ref}$ of movement in the Cartesian space so as to avoid undesired and/or potentially dangerous behaviours of the robot manipulator 5, determining the anti-singularity indications $X^*_{ref}$.

In the non-limiting embodiment of FIG. 3, the method comprises the further step of changing the control SA of the singularities based on a kinematic family CF to which the robot manipulator 5 belongs.

In particular, singularity control refers to "singularity avoidance" algorithms, for example, but not limited to, of the following types:

Damped-Least Squares Jacobian (DLS), described for example in "Resolved Motion Rate Control of Manipulators and Human Prostheses", D. E. Whitney, IEEE Transactions on Man-Machine Systems (TMMS), 1969;

Genetic Algorithms, described for example in "Using Genetic Algorithms for singularity Avoidance in Positioning Tasks of a Robotic Arm", M. Nasr et al., Information Models and Analyses, 2018;

Exponentially DLS, described for example in "Prediction-Error Negativity to assess Singularity Avoidance Strategies in physical Human-Robot Collaboration", S. Aldini et al., IEEE International Conference on Robotics and Automation (ICRA), 2021;

Control Barrier Functions, described for example in "Control Barrier Functions for Singularity Avoidance in Passivity-Based Manipulator Control", V. Kurtz et al., IEEE Conference on Decision and Control (CDC), 2021.

In some non-limiting cases, the kinematic family CF is selected by the operator before carrying out the learning step.

The term "kinematic family CF" means a set of manipulators having similar kinematic characteristics involving:

the presence of similarities between the singularities characterizing the manipulators belonging to the family (e.g. manipulators with the same type and/or number of joints); and/or similarity in the occurrence of the problems of absence or multiplicity of the solutions of the inverse kinematic problem applied to manipulators belonging to the family.

Non-limiting examples of kinematic family are: six-degree freedom manipulators with spherical wrist, six-degree freedom manipulators with offset wrist, and redundant manipulators (7 or more degrees of freedom) with spherical wrist.

Preferably but not limited to, the width of the kinematic family CF is defined experimentally, depending also on the types of manipulators produced or used.

Advantageously but not necessarily, during the learning step, the processing system 11 estimates a non-contact force and torque $F_{nc}$ depending on the fixed and variable components resulting from the load (in particular, the handling device) of what is mounted on (more precisely, supported by) the sensor 10 (more precisely, to a sensitive part of the sensor 10) and obtains the estimated force and torque $F^*_c$ (applied by the operator on the handling device 9) depending on the detected force and torque $F_{ext}$ and the estimated non-contact force and torque $F_{nc}$. In these cases, the processing system 11 provides indications $X_{ref}$ of movement for the robot manipulator 5 depending on the force and torque $F^*_c$ estimated and provided by the processing system 11. In particular, the force and the torque $F^*_c$ are estimated by subtracting the force and the non-contact torque $F_{nc}$ from the detected force and torque $F_{ext}$.

According to some non-limiting embodiments, the fixed and variable components resulting from the load comprise gravity and inertial and Coriolis forces. In particular, the variable components are estimated depending on the angular speed ω, the angular acceleration α, the linear acceleration a and the inertia (inertia sensor) of what is mounted on (more precisely, supported by) the sensor 10 (more precisely, on a sensitive part of the sensor 10).

During human-robot interaction, stability must be ensured to make the system safe and minimize the operator's physical effort. The admittance control is used for this purpose and the choice of the relative parameters is of utmost importance. What is proposed here allows to identify the deviations from the nominal behaviour of a robot controlled in admittance, adapting the parameters of the controller so as to guarantee its passivity.

The choice of the parameters influences the way the robot interacts with the operator. For example, if the operation requires fine movements, the inertia and the damping will have high values to make the robot less reactive and obtain a smoother movement. Conversely, if the operation requires high speeds and accelerations, the parameters will have lower values. In addition, the rigidity that the operator exerts during interaction with the robot also influences the behaviour of the system. In particular, the more rigid the operator is, the more the system moves away from the ideal behaviour defined by the equation (B), vibrating and making the interaction difficult and unsafe. For this reason, the deviations from the ideal behaviour must first be identified and subsequently cancelled (or reduced), restoring the stability of the system.

Preferably, in the parameter adaptation unit PA of the admittance control AC, the parameters of the admittance control are adjusted online, i.e. during the interaction between the operator and the robot. Initially a heuristic is defined to recognize the deviations of the robot from the nominal behaviour; subsequently a method is presented for the adaptation of the parameters that guarantees the restoration of the nominal conditions, without excessively increasing the physical effort of the operator. The passivity and thus the stability of the robot controlled in admittance is guaranteed. A less conservative solution is proposed that envisages the use of virtual energy tanks, which store the energy dissipated by the system in order to be able to reuse it later.

According to some non-limiting embodiments, the inertia and damping parameters are varied (adapted) when the following inequality is not verified:

$$\psi(\dot{x}, \ddot{x}, F_s) = \|F_s - M_d \ddot{x} - D_d \dot{x}\| \le \varepsilon \qquad (14)$$

wherein ε>0 is an experimentally derived minimum threshold. As already indicated above, $M_d$ e $D_d$ are the desired inertia and damping matrix, $\dot{x}$ is the Cartesian speed and $\ddot{x}$ is the Cartesian acceleration.

Considering the dynamic behaviour of the admittance control, the behaviour of the robot is defined with "nominal behaviour" when the inequality is valid (14).

Using this equation, it is possible to define a heuristic for the identification of the deviation from the nominal behaviour, which can be found when, for example, the operator stiffens his arm during the interaction with the robot.

Once this deviation has been identified, the parameters of the admittance control must be adapted. Through the use of energy tanks it is possible to define the increase in inertia necessary to bring the system back to the nominal conditions, guaranteeing the passivity thereof.

Advantageously but not necessarily (during the learning step), the admittance control (of the control system 16) is varied (adapted) depending on the detected force and torque $F_s$. In particular, the parameters of the admittance control are varied (adapted). More particularly, the inertia and damping parameters of the admittance control are varied (adapted).

According to some non-limiting embodiments, the admittance control (of the control system 16) is varied (adapted) by modifying (adapting) the parameters of the admittance control. More particularly, the inertia and damping parameters of the admittance control are varied (adapted).

According to some non-limiting embodiments, the damping is varied so as to maintain the ratio of inertia to damping substantially constant. This allows to maintain the dynamics of the system similar to the one before the variation, which is more intuitive for the operator.

According to some non-limiting embodiments, during the learning step, the operator adjusts, over time, at least one operating parameter of the end effector 4 and the applied operating parameter (and its variation over time) is substantially stored by the storage unit 8. In these cases, during the reproduction step, the control system 6 adjusts the activation of the spraying head 4 so that the operating parameter stored during the learning step (and its variation over time) is substantially repeated. Advantageously but not necessarily, during the reproduction step, the control system 6 adjusts the activation of the end effector 4 so that the operating parameter stored during the learning step (and its variation over time) is substantially repeated, in particular in a coordinated manner with the movements made by the end effector 4.

Advantageously but not necessarily, the operating parameter is chosen as described above.

Advantageously but not necessarily, during the learning step, the operator moves the (in particular, adjusts, over time, the orientation of the) article 2 and the position thus obtained (in particular, the orientation obtained and its variation over time) is stored by the storage unit. In these cases, during the reproduction step, the control system 6 adjusts the position (the orientation) of the article 2 so that the position (the orientation) of the article 2 stored during the learning step (and its variation over time) is substantially repeated, in particular in a coordinated manner with the movements made by the end effector 4.

According to some non-limiting embodiments, during the learning step, the driving assembly 7 provides indications of movement to the control system 6, which in turn activates the robot manipulator 5 based on the indications received from the driving assembly 7.

Advantageously but not necessarily, the handling device 9 comprises at least one grip 12, which, during the learning step, is grasped by the operator to move the spraying head 4.

In particular, the handling device 9 comprises at least two grips 12, which, during the learning step, are grasped by the operator to move the spraying head 4 and are connected to each other in an integral manner, in particular by means of a connection element of the handling device.

According to some embodiments, the article 2 is a ceramic article, in particular a sanitary article such as a washbasin and/or a sink and/or console and/or shower tray.

According to a further aspect of the present invention, there is provided a kit for programming a control of an existing closed robotised system. The kit comprising:

the driving assembly 7, which can be installed (and removed) on a robot manipulator 5 and comprises the handling device, upon which, in use, the operator exerts a contact force and torque Fc;

the sensor 10, which can be connected (and removed) to the end effector 4 of the robotised system 3 and is designed to detect the force and the torque $F_{ext}$ applied to the handling device 9; and the processing system 11, which is designed to provide Cartesian movement indications for the robot manipulator 5 depending on the data detected by the sensor 10 and following an admittance control. In particular, the kit is configured to be installed on an existing closed robotised system 3 and carry out the method described previously.

Although the above-described invention makes particular reference to a very precise example of implementation, it is not limited to that example of implementation, since all those variations, modifications or simplifications covered by the appended Claims, such as a different geometry of the robot manipulator 5, a different type of end effector, a different subdivision of the steps of the method, etc., fall within its scope.

The plant and the method described above have numerous advantages.

Firstly, such an architecture ensures that the robot manipulator 5 follows the trajectory imposed by the human operator (through the force/torque sensor and the admittance control) by exploiting only the functions of a standard (closed) control system and without the need for a compulsorily open controller interface.

In addition, this makes it possible to achieve high speeds during the teaching step, while ensuring the stability of the system and the safety of the human operator. This makes it possible to help companies achieve a greater production flexibility to cope with rapidly evolving products.

Finally, a simple integration of a generic closed robotised system can be realized using the kit indicated above.

We claim:

1. A method to control a closed robotised system; the method comprising:

a learning step, during which an operator moves an end effector of a robot manipulator of the robotised system by means of a driving assembly comprising a force/torque sensor and the movements made by the end effector are stored in a storage unit of the robotised system;

a reproduction step, which takes place after the learning step and during which a control system operates the robot manipulator so that the end effector substantially repeats the movements stored in the storage unit;

wherein, during the learning step, the operator exerts a force and/or a torque ($F_c$) upon the driving assembly, wherein the sensor detects an applied force and/or torque ($F_{ext}$); and wherein a processing system carries out an admittance control obtaining, depending on the data detected by the sensor, indications ($X_{ref}$, $X^*_{ref}$) of movement for the robot manipulator in the Cartesian space;

the processing system, following the admittance control, delivers the indications ($X_{ref}$, $X^*_{ref}$) of movement in the Cartesian space to a trajectory interpolation unit of the robotised system so as to generate a desired trajectory of the end effector through interpolation;

the method comprising the further steps of:

defining a dynamic target reference system (DTRF) for the robot manipulator, i.e. a time-varying reference system at least at a degree of freedom that the end effector must follow in Cartesian coordinates;

setting the position of the end effector as the initial reference position of the dynamic target reference system (DTRF);

synchronising the position of the end effector with that of the dynamic target reference system (DTRF);

changing the position of the dynamic target reference system (DTRF) abased on the indications ($X_{ref}$, $X^*_{ref}$) of movement processed during the admittance control.

2. The method according to claim 1, wherein the interpolation unit of the robotised system converts the indications ($X_{ref}$, $X^*_{ref}$) of movement in the Cartesian space into indications ($q_{ref}$) of movement in the joint space.

3. The method according to claim 1, further comprising:

following the admittance control; and before the interpolation, carrying out a singularity control on the indications (Xref, X*ref) of movement in the Cartesian space so as to avoid undesired and/or potentially dangerous behaviours of the robot manipulator.

4. The method according to claim 3, further comprising:

changing the singularity control based on a kinematic family to which the robot manipulator belongs.

5. The method according to claim 4, wherein the kinematic family is selected by the operator before carrying out the learning step.

6. The method according to claim 1, wherein:

during the learning step, the processing system estimates a non-contact force and torque ($F_{nc}$) depending on fixed and variable components resulting from the load (in particular, of the handling device) of what is mounted on the sensor and obtains an estimated force and torque ($F^*_c$) (in particular, applied by the operator to the handling device) depending on the detected force and torque ($F_s$) and on the estimated non-contact force and torque ($F_{nc}$); and the processing system provides indications (Xref, X*ref) of movement for the robot manipulator depending on the estimated force and torque ($F^*_c$) provided by the processing system; in particular, the estimated force and torque ($F^*_c$) are estimated subtracting the non-contact force and torque ($F_c$) from the measured force ($F_{ext}$).

7. The method according to claim 1, wherein the processing system comprises a processing unit and the processing unit comprises, in particular is, a Kalman filter.

8. The method according to claim 1, wherein:
during the learning step, the admittance control is changed depending on the detected force and torque ($F_s$); and
in particular, the parameters of inertia and damping of the admittance control are changed depending on the detected force and torque ($F_s$).

9. The method according to claim 8, wherein the admittance control is changed online, during the movement of the end effector by the operator.

10. The method according to claim 1, wherein:
the driving assembly comprises commands, which are operated by the operator in order to adjust, over time, at least one operating parameter of the end effector;
the storage unit stores the adjustment of the operating parameter; and
the control system adjusts the activation of the tool so that the adjustment of the operating parameter is substantially repeated in a coordinated manner with the movements made by the robot manipulator.

11. A processing plant provided with a closed robotised system, the plant comprising:
a robotised system, which, in turn, comprises an end effector, which is configured to process or interact with an article being produced;
a robot manipulator, which is movable with at least three degrees of freedom and on which the end effector is mounted;
a control system, which comprises a storage unit and is configured to control the movement of the robot manipulator so as to move the end effector in the space;
a driving assembly, which is configured to be operated by an operator so as to transfer indications (Xref, X*ref) of movement to the robot manipulator;
the driving assembly comprises a handling device, upon which, in use, the operator exerts a force and torque (Fc); a sensor, which is connected to the end effector and is designed to detect a force and torque (Fs) applied to the handling device; and a processing system, which is designed to provide Cartesian movement indications (Xref, X*ref) for the robot manipulator depending on the data detected by the sensor and following an admittance control;
the storage unit is designed to store the movements made by the robot manipulator while the end effector is moved by the operator by means of the driving assembly; the control system is designed to control the movement of the end effector based on the movements stored by the storage unit;
the plant being configured so as to carry out the method according to claim 1.

12. The plant according to claim 11, further comprising:
a spraying head;
wherein the spraying head is configured to emit a jet of a substance to cover at least part of the surface of a ceramic article.

13. A kit for programming a control of a closed robotised system comprising:
a driving assembly, which can be installed on a robot manipulator and comprises a handling device, upon which, in use, the operator exerts a force and torque (Fc);
a sensor, which can be connected to an end effector of the robotised system and is designed to detect a force and torque ($F_{ext}$) applied to the handling device; and
a processing system, which is designed to provide Cartesian movement indications (Xref, X*ref) for the robot manipulator depending on the data detected by the sensor and following an admittance control;
the kit being configured to be installed on a closed robotised system and to carry out the method according to claim 1.

\* \* \* \* \*